(12) United States Patent
Garcia et al.

(10) Patent No.: US 11,850,663 B2
(45) Date of Patent: Dec. 26, 2023

(54) CEMENTED CARBIDE WITH ALTERNATIVE BINDER

(71) Applicant: AB SANDVIK COROMANT, Sandviken (SE)

(72) Inventors: Jose Luis Garcia, Stockholm (SE); Bartek Kaplan, Sundbyberg (SE); Veronica Collado Cipres, Hagersten (SE)

(73) Assignee: AB SANDVIK COROMANT, Sandviken (SE)

( * ) Notice: Subject to any disclaimer, the term of this patent is extended or adjusted under 35 U.S.C. 154(b) by 228 days.

(21) Appl. No.: 17/252,939

(22) PCT Filed: Jun. 26, 2019

(86) PCT No.: PCT/EP2019/067026
§ 371 (c)(1),
(2) Date: Dec. 16, 2020

(87) PCT Pub. No.: WO2020/002442
PCT Pub. Date: Jan. 2, 2020

(65) Prior Publication Data
US 2021/0138546 A1    May 13, 2021

(30) Foreign Application Priority Data
Jun. 29, 2018 (EP) .................................... 18180915

(51) Int. Cl.
*B22F 5/00*    (2006.01)
*B22F 3/24*    (2006.01)
(Continued)

(52) U.S. Cl.
CPC .................. *B22F 5/00* (2013.01); *B22F 3/24* (2013.01); *C22C 29/067* (2013.01); *C22C 29/08* (2013.01);
(Continued)

(58) Field of Classification Search
CPC ........ B22F 5/00; B22F 3/24; B22F 2003/242; B22F 2005/001; B22F 2207/05;
(Continued)

(56) References Cited

U.S. PATENT DOCUMENTS 2,867,033 A * 1/1959 Graham .................. C22C 29/06
                                                    75/255
4,843,039 A * 6/1989 Akesson .................... C23C 8/00
                                                    428/404

(Continued)

OTHER PUBLICATIONS

Edholm, Oscar, "Design of Cemented Carbide with Ni-based Superalloy Binder Strengthened with γ'-Ni3Al precipitates" (Year: 2018).*

(Continued)

Primary Examiner — Brian D Walck
Assistant Examiner — Danielle Carda
(74) Attorney, Agent, or Firm — Corinne R. Gorski

(57) ABSTRACT

A cemented carbide including an eta phase and a Ni—Al binder is provided. The Ni—Al binder includes intermetallic y'-$Ni_3Al$ -precipitates embedded in a substitutional solid solution matrix of Al and Ni. A weight ratio Al/Ni of between 0.03 to 0.10, wherein a total amount of Ni and Al is between 70 to 95 wt % of the total binder A method of making a cutting tool is also provided.

8 Claims, 1 Drawing Sheet

(51) Int. Cl.
    *C22C 29/06*     (2006.01)
    *C22C 29/08*     (2006.01)
    *B82Y 30/00*     (2011.01)
    *B82Y 40/00*     (2011.01)

(52) U.S. Cl.
CPC ... *B22F 2003/242* (2013.01); *B22F 2005/001* (2013.01); *B22F 2207/05* (2013.01); *B22F 2302/15* (2013.01); *B22F 2999/00* (2013.01); *B82Y 30/00* (2013.01); *B82Y 40/00* (2013.01)

(58) Field of Classification Search
CPC ............. B22F 2302/15; B22F 2999/00; C22C 29/067; C22C 29/08; C22C 1/0491; C22C 1/047; B82Y 30/00; B82Y 40/00; C23C 28/044; C23C 30/005
USPC .......................................................... 75/240
See application file for complete search history.

(56) References Cited

U.S. PATENT DOCUMENTS

| | | | |
|---|---|---|---|
| 5,905,937 A | 5/1999 | Plucknett et al. | |
| 2010/0239855 A1* | 9/2010 | Gries | C23C 30/005 428/335 |
| 2018/0029118 A1 | 2/2018 | Gries | |

OTHER PUBLICATIONS

Xiaoqiant Li et al: "Preparation and mechanical properties of WC-10 Ni3Al cemented carbides with plate-like triangular prismatic WC grains," Journal of Alloys and Compounds. vol. 544, Dec. 1, 2012, pp. 134-140, CH.

Kai Zhang et al: "Microstructure and composition of the grain/binder interface in WC-Ni3Al composites", International Journal of Refractory Metals and Hard Materials. vol. 44, May 1, 2014, pp. 88-93, Amsterdam, NL.

* cited by examiner

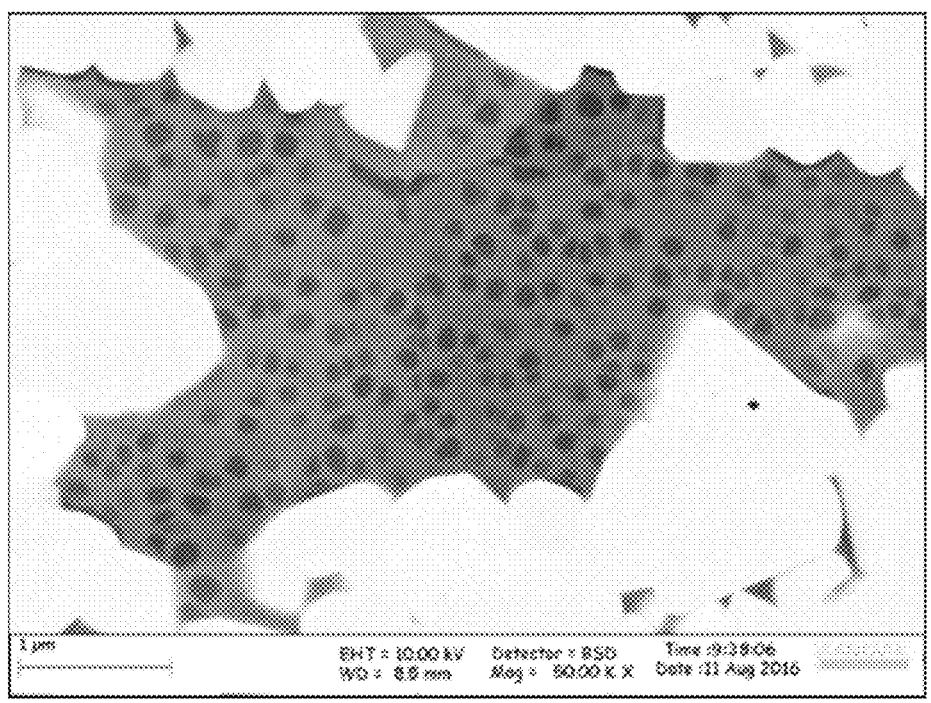

CEMENTED CARBIDE WITH ALTERNATIVE BINDER

RELATED APPLICATION DATA

This application is a § 371 National Stage Application of PCT International Application No. PCT/EP2019/067026 filed Jun. 26, 2019 claiming priority to EP 18180915.3 filed Jun. 29, 2018.

The present invention relates to a cutting tool and a method of making a cutting tool comprising a cemented carbide substrate comprising tungsten carbide and a binder where the binder comprises y'-precipitates in a substitutional solid solution matrix and wherein the cemented carbide comprises eta phase.

BACKGROUND

Cemented carbides based on WC with a cobalt binder have been known in the art since the twenties. Other metals that are known as binder metals in cemented carbides are iron and nickel, however cobalt is by far the most used.

It is an ongoing strive to find alternative binders to cobalt due to its environmental and health impact. However, it is difficult to replace or limit the amount of cobalt without impacting material properties in a negative way. For cutting tools the substrate properties are important for the overall performance of the tool and even small changes in composition can have a detrimental impact on performance.

Nickel presents good wettability to WC making it suitable to produce cemented carbides. Ni also present better performance in oxidation and corrosion conditions compared to WC-Co cemented carbides. The major drawback of Ni-based cemented carbides is their reduced mechanical strength. One reason is the higher stacking fault energy of Ni compared to Co, which makes work hardening of Ni only moderate as compared to Co.

To overcome the performance shortcomings of WC-Ni cemented carbides different methods to increase strength and/or hardness have been proposed; for example to fabricate sub-micrometer or close-to-nano WC-Ni cemented carbides (Hall-Petch relationship) by inhibiting the growth of WC grains during sintering; or to add some elements which promote high strength and/or high hardness into the matrix of WC-Ni cemented carbides.

Ni—Al binders as such are known for cemented carbides. $Ni_3Al$ is an intermetallic with high hardness and melting point. Cemented carbides made of WC embedded in $Ni_3Al$ binder have been reported to have high hardness and reduced toughness, making them less suitable for cutting tool substrates. Therefore, in order to achieve a binder with the aimed properties (comparable to cobalt), the NiAl binder needs to be optimized.

SUMMARY

It is an object of the invention to be able to manufacture a cemented carbide with an alternative binder phase which has equal or improved properties as compared to a substrate with a Co binder.

It is also an object of the invention to be able to manufacture a cemented carbide with a $Ni_3Al$ binder where the formation of the y'-$Ni_3Al$-precipitates can be controlled.

DESCRIPTION OF DRAWINGS

FIG. 1 shows a SEM image of a binder phase according to the present invention, Invention 1 from the examples.

DETAILED DESCRIPTION OF THE INVENTION

The present invention relates to a cutting tool comprising a cemented carbide substrate comprising tungsten carbide and 3 to 20 wt % binder. The binder comprises intermetallic y'-$Ni_3Al$-precipitates embedded in a substitutional solid solution matrix comprising Al and Ni with a weight ratio Al/Ni is between 0.03 to 0.10 and wherein the total amount of Ni and Al is between 70 to 95 wt % of the total binder. The cemented carbide further comprises eta phase and a total carbon content in the cemented carbide, C (wt %), that is below a value X, where X is given by the following equation:

$$X = \left(0.0617 * \frac{\text{wt\% Al}}{\text{wt\% Ni}} - 0.0768\right) * (\text{wt\% Ni} + \text{wt\% Al}) + 6.1323 \quad \text{Equation 1}$$

The equation is valid for cemented carbides comprising a binder in an amount of 3 to 20 wt % where the amount of Ni and Al is suitably from 70 to 95 wt % of the binder and where the weight ratio Al/Ni is between 0.03 to 0.10.

It has been discovered that by lowering the total carbon content in the cemented carbide, so that eta phase is present in the microstructure, a cemented carbide containing a hard phase (principally WC) embedded in a Ni—Al substitutional solid solution that contains y'-$Ni_3Al$-precipitates finely dispersed in the binder matrix can be produced. The mechanical properties of such a cemented carbide combine adequate hardness/toughness behavior by having a hard phase containing a ductile binder phase strengthened by y'-$Ni_3Al$-precipitates.

By intermetallic y'-$Ni_3Al$-precipitate is herein meant a semi-coherent precipitate with a cubic crystal structure (space group Pm-3m) that differs from the surrounding binder in that the Al atoms preferentially occupy the 1a sites, while the solid solution binder exhibits random elemental occupancy on all sites.

Suitably, the average grain size of the y'-$Ni_3Al$ precipitates is between 10 to 1000 nm, preferably between 10 and 500 nm. The grain size of the precipitates is suitably measured by image analysis in a SEM image of a cross section using the mean linear intercept method.

By a substitutional solid solution is herein meant a solid solution in which the solvent and solute atoms are located randomly at the lattice sites in the crystal structure of the phase. Elements such as C and N may also be present, but on interstitial sites.

The amount of binder is preferably between 3 to 20 wt % of the cemented carbide, preferably 5 to 15 wt %.

The weight ratio between Al/Ni is suitably between 0.03 to 0.10 and preferably 0.03 to 0.07.

The amount of Ni and Al is suitably from 70 to 95 wt % of the binder, preferably from 80 to 95 wt %.

The binder always comprises certain amounts of W and C which are dissolved during the consolidation process from the WC during the sintering process. The exact amount is dependent on the overall composition of the cemented carbide.

The cemented carbide has a substoichiometric carbon content so that eta phase is formed. By eta phase is herein meant carbides selected from $Me_{12}C$ and $Me_6C$ where Me is selected from W, and one or more of the binder phase metals.

The average grain size of the eta phase is suitably between 0.1 to 10 µm, preferably between 0.1 to 3 µm and more preferably 0.1 to 1 µm. This can be measured in different ways, e.g. by mean linear intercept on a SEM/LOM image.

The distribution of the eta phase should be as even as possible.

In one embodiment of the present invention, the volume fraction of the eta phase is suitably between 0.05 to 30 vol %, preferably between 0.5 to 15 vol %, more preferably between 0.8 to 8 vol %, even more preferably between 1 to 4 vol %.

In one embodiment of the present invention the eta phase is well distributed in a suitable amount which is necessary to obtain the improved properties. A well distributed eta phase is achieved by keeping the carbon content within certain limits. This is achieved by controlling the carbon balance carefully during manufacturing. By well distributed is herein meant that the cemented carbide is free from large clusters of particles.

The total carbon content in the cemented carbide, C (wt %), is suitably below a value X, where X is given by the following equation:

$$X = \left(0.0617 * \frac{wt\% \ Al}{wt\% \ Ni} - 0.0768\right) * (wt\% \ Ni + wt\% \ Al) + 6.1323$$

The equation is valid for cemented carbides comprising a binder in an amount of 3 to 20 wt % where the amount of Ni and Al is suitably from 70 to 95 wt % of the binder and where the weight ratio Al/Ni is between 0.03 to 0.10.

The lower limit of the total carbon content in the cemented carbide is where phases other than WC, binder, (possibly gamma phase if that is present), and eta phase will form. In practice, the maximum amount of eta phase that is desired in the cemented carbide depends on the specific application of the cutting tool. Increasing the amount of eta phase too much can lead to that the cemented carbide becomes brittle. Hence, as a guidance, there should not be more than 30 vol % eta phase, preferably no more than 15 vol % in the cemented carbide.

If the total carbon content is close to the upper limit given by equation 1, there is a risk that the formed eta phase will be unevenly distributed, i.e. located in large clusters. This might be undesired for certain applications. The difference in total carbon content between achieving the unwanted large clusters of eta phase and achieving the finely distributed eta phase that is aimed for, can be very small. Being close to that limit requires monitoring the microstructure to make sure that the unwanted large clusters are avoided. The limit for when finely distributed eta phase is achieved depends on the overall composition of the cemented carbide as it is known for a person skilled in the art.

In one embodiment of the present invention the cemented carbide is essentially free from Co and by that is herein meant that no Co is added as raw material and that Co is present in the cemented carbide is on a level of impurity, preferably below 1 wt %. Small amounts of Co are usually detected since some manufacturing equipment, like e.g. milling bodies, contains cemented carbide and can give a small contribution to the overall composition.

In one embodiment of the present invention the cemented carbide is essentially free from Mo and by that is herein meant that no Mo is added as raw material and that Mo is present in the cemented carbide i on a level of an impurity, preferably below 1 wt % for Mo.

Mo is here not wanted in the material since it may dissolve in the WC, altering its properties, or form sub-carbides with a coarse structure akin to that of the binder, which is severely embrittling.

The average grain size of the WC is suitably between 0.2 to 10 µm, preferably between 0.2 to 5 µm.

In one embodiment of the present invention, the cemented carbide substrate is provided with a wear resistant CVD (Chemical vapor deposition) or PVD (Physical vapor deposition) coating.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In yet another embodiment of the present invention, the cemented carbide substrate is provided with a wear resistant CVD coating.

In yet another embodiment of the present invention, the cemented carbide substrate is provided with a wear resistant CVD coating comprising several layers, suitably at least a carbonitride layer and an $Al_2O_3$ layer.

By cutting tool is herein meant an insert, end mill or drill.

The present invention also relates to a method of making a cutting tool according to the above comprising a cemented carbide substrate as described above. The method comprises the following steps:

providing powders forming hard constituents comprising WC providing Al and Ni containing powder(s) forming the binder phase providing a milling liquid, milling, drying, pressing and sintering the powders into a cemented carbide.

The raw materials forming the binder phase can be added as pure metals, alloys of two or more metals or as carbides, nitrides or carbonitrides thereof. The raw materials should be added in such amounts so that the binder phase, after sintering will have the composition as has been described above.

The powders forming hard constituents comprises WC, preferably with an average grain size of 0.2-10 µm, more preferably 0.2-5 µm.

Changing the carbon content in a cemented carbide can be done by either adding carbon black, if an increase in carbon is desired. Or, by adding W, or $W_2C$, if a decrease in carbon is desired.

Any liquid commonly used as a milling liquid in conventional cemented carbide manufacturing can be used. The milling liquid is preferably water, alcohol or an organic solvent, more preferably water or a water and alcohol mixture and most preferably a water and ethanol mixture. The properties of the slurry are dependent on the amount of milling liquid added. Since the drying of the slurry requires energy, the amount of liquid should be minimized to keep costs down. However, enough liquid needs to be added to achieve a pumpable slurry and avoid clogging of the system. Also, other compounds commonly known in the art can be added to the slurry e.g. dispersion agents, pH-adjusters etc.

An organic binder is also optionally added to the slurry in order to facilitate the granulation during the following spray drying operation but also to function as a pressing agent for any following pressing and sintering operations. The organic binder can be any binder commonly used in the art. The organic binder can e.g. be paraffin, polyethylene glycol (PEG), long chain fatty acids etc. The amount of organic binder is suitably between 15 and 25 vol % based on the total dry powder volume, the amount of organic binder is not included in the total dry powder volume.

The slurry comprising powders forming hard constituents and powders forming the binder phase, and possibly an organic binder is suitably mixed by a milling operation, either in a ball mill or attritor mill. The milling is suitably made by first forming a slurry comprising metal binder powder, the first and second powder fraction, and possibly an organic binder. Then the slurry is suitably milled in a ball mill or attritor mill to obtain a homogenous slurry blend.

The slurry containing the powdered materials mixed with the organic liquid and possibly the organic binder is atomized through an appropriate nozzle in the drying tower where the small drops are instantaneously dried by a stream of hot gas, for instance in a stream of nitrogen, to form agglomerated granules. For small scale experiments, also other drying methods can be used, e.g. pan drying.

Green bodies are subsequently formed from the dried powders/granules by a pressing operation such as uniaxial pressing, multiaxial pressing etc.

The green bodies formed from the powders/granules made according to the present invention, is subsequently sintered according to any conventional sintering methods e.g. vacuum sintering, Sinter HIP, spark plasma sintering, gas pressure sintering (GPS) etc.

The sintering is suitably performed at liquid phase temperatures. The exact temperature depends on the exact composition of the binder.

In one embodiment of the present invention, the sintering temperature is between 1350 and 1550° C.

In one embodiment of the present invention the cemented carbide substrates are provided with a coating.

In one embodiment of the present invention the cemented carbide substrates made according to the above, are provided with a wear resistant coating using CVD or PVD-technique.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In one embodiment of the present invention a CVD coating is deposited comprising a first TiCN layer deposited by MTCVD and a second α-$Al_2O_3$ layer deposited by CVD. Possibly an outermost color layer for wear detection, e.g. a TiN layer, can also be deposited.

In one embodiment of the present invention, a CVD coating is deposited comprising a layer of (Al,Ti)N deposited by Low pressure CVD. Possibly an outermost colour layer for wear detection, e.g. a TiN layer, can also be deposited.

The coating can also be subjected to additional treatments, such as brushing, blasting etc.

The present invention also discloses a cemented carbide cutting tool made according to the method described above.

EXAMPLE 1

Cemented carbides were prepared from a pre-alloyed NiAl material consisting of 93.9 wt % Ni and 5.3 wt % Al (NiAl-1) or 94.4 wt % Ni and 5.6 wt % Al (NiAl-2), $Cr_3C_2$ raw material and WC with an average particle size (FSSS) of 0.81-0.87 μm for WC0B, 1.24-1.44 μm for WC2B and 5.5-6.3 μm for WC5B in accordance with the compositions in Table 1. The amount of each raw material is based on the total dry powder weight where the balance is WC, except for when eta phase is formed, then small amounts of W has been added to adjust the carbon content according to Table 1.

TABLE 1

|  | WC | NiAl raw material | $Cr_3C_2$ (wt %) | Co (wt %) | wt % C below stoichiometric (Powder) |
|---|---|---|---|---|---|
| Invention 1 | WC2B | 6% (NiAl-2) | — | — | −0.17 |
| Comparative 1 | WC5B | 10% (NiAl-1) | — | — | 0.0 |
| Comparative 2 | WC0B | 7.2% (NiAl-2) | 0.5 | 2.8 | −0.13 |
| Comparative 3 | WC2B | 6% Ni | — | — | −0.13 |
| Comparative 4 | WC2B | — | — | 6 | 0.06 |

The powders were milled together with a milling liquid (water/ethanol) and an organic binder (PEG) 2 wt % calculated from the total dry powder weight. The formed slurry was then pan dried and the dried powder was then subjected to a pressing operation to form a green body.

The green bodies of samples Invention 1, Comparative 1 and 2 was then sintered at a temperature of 1450° C. for 1 h in vacuum after a debinding step in hydrogen at 400 degrees. Comparative 3 and 4 was sintered in 40 mbar Ar+CO at 1410° C.

Properties of the samples are shown in table 2. The total carbon content in wt % has been measured by using a LECO WC-600 instrument, for this analysis, the sample was crushed prior to the analysis. The accuracy of the values is ±0.01 wt %. The HV3 has been measured according to ASTM B294. The fracture toughness, K1C, has been measured according to Shetty.

The size of the precipitates, i.e. the average grain size of precipitates, has been measured by the mean linear intercept method.

The amount of eta phase in Table 2 was determined by image analysis on LOM images having the same magnification where all samples have the same polishing and etching and where the software Image J has been used, with the same settings for all measurements.

TABLE 2

|  | Ctot (wt %) sintered | X (C-limit) | Eta phase (Vol %) | Average size of precipitates | HV3 | K1C (MPa/m) |
|---|---|---|---|---|---|---|
| Invention 1 | 5.55 | 5.70 | 3 | 150 nm | 1638 | 8 |
| Comparative 1 | 5.45 | 5.40 | None | No presence | 1219 | 12.5 |
| Comparative 2 | 5.24 | n.a. | Present, not measured | No presence | 1568 | 9.3 |
| Comparative 3 | 5.53 | 5.67 | 3 | No presence | 1531 | 8.3 |
| Comparative 4 | n.a. | n.a. | None | No presence | 1590 | 9.1 |

The sintered bodies were studied in a Scanning Electron Microscope (SEM). The results for Invention 1 can be seen in FIG. 1.

In Table 2 it can clearly be seen that Invention 1 has an improved hardness, as compared to Comparative 3 (pure Ni-binder) at about the same toughness.

It should also be noted that no γ'-$Ni_3Al$-precipitates could be seen in Comparative 1 where the carbon content is above the calculated value X.

The invention claimed is:

1. A cutting tool comprising a cemented carbide substrate including tungsten carbide and 3 to 20 wt % binder, the binder including intermetallic y'-Ni$_3$Al-precipitates having an average grain size of between 10 and 1000 nm embedded in a substitutional solid solution matrix having Al and Ni with a weight ratio Al/Ni of between 0.03 to 0.10, wherein a total amount of Ni and Al is between 80 to 95 wt % of a total binder and wherein the cemented carbide substrate includes a volume fraction of eta phase of between 0.8 and 8 vol % and a total carbon content in the cemented carbide substrate, C (wt %), that is below a value X, where X is given by the following equation:

$$X = \left(0.0617 * \frac{\text{wt\% Al}}{\text{wt\% Ni}} - 0.0768\right) * (\text{wt\% Ni} + \text{wt\% Al}) + 6.1323,$$

wherein the wt % Al and the wt % Ni is the amount present in the cemented carbide substrate.

2. The cutting tool according to claim 1, wherein an average grain of size of the intermetallic y'-Ni$_3$Al-precipitates is between 10 and 500 nm.

3. The cutting tool according to claim 1, wherein the weight ratio between Al/Ni is between 0.03 to 0.07.

4. The cutting tool according to claim 1, wherein the cemented carbide substrate is essentially free of Co.

5. The cutting tool according to claim 1, wherein the cemented carbide substrate is essentially free of Mo.

6. A method of making a cutting tool according to claim 1, the method comprising the steps of:
   providing powders forming hard constituents including WC;
   providing Al and Ni containing powder(s) forming the binder phase;
   providing a milling liquid; and
   milling, drying, pressing and sintering the powders into a cemented carbide.

7. The method of making a cutting tool according to claim 6, wherein the Al and Ni containing powder(s) is added as a pre-alloyed powder.

8. The method of making a cutting tool according to claim 6, wherein the cutting tool is provided with a wear resistant CVD or PVD coating.

* * * * *